June 24, 1958
R. J. EISCHENS
2,839,885
PICKUP DEVICE WITH ENDLESS BELT PICKUP REEL
Filed Sept. 9, 1955
2 Sheets-Sheet 1
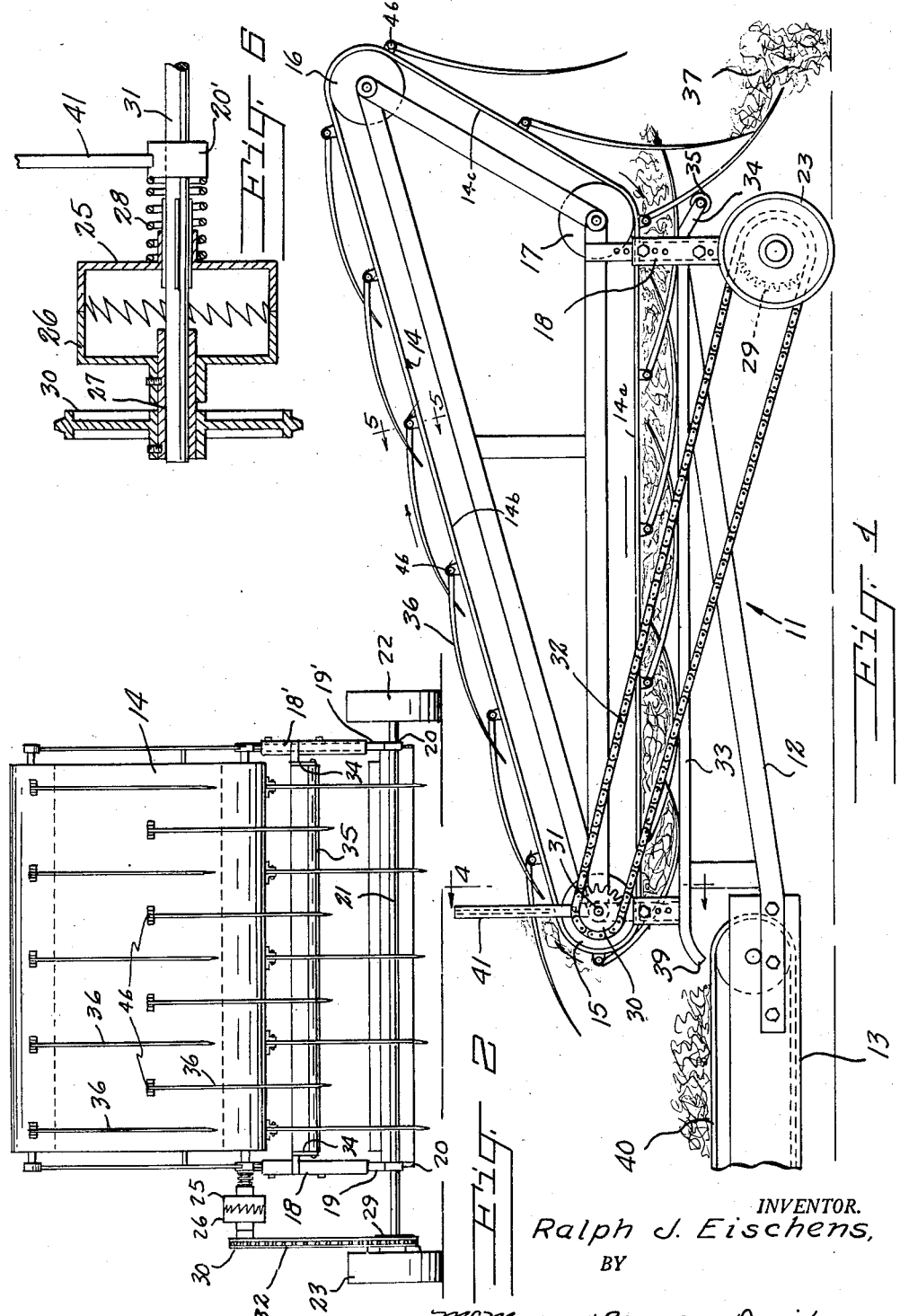
INVENTOR.
Ralph J. Eischens,
BY
McMorrow, Berman + Davidson
ATTORNEYS June 24, 1958  R. J. EISCHENS  2,839,885
PICKUP DEVICE WITH ENDLESS BELT PICKUP REEL
Filed Sept. 9, 1955  2 Sheets-Sheet 2
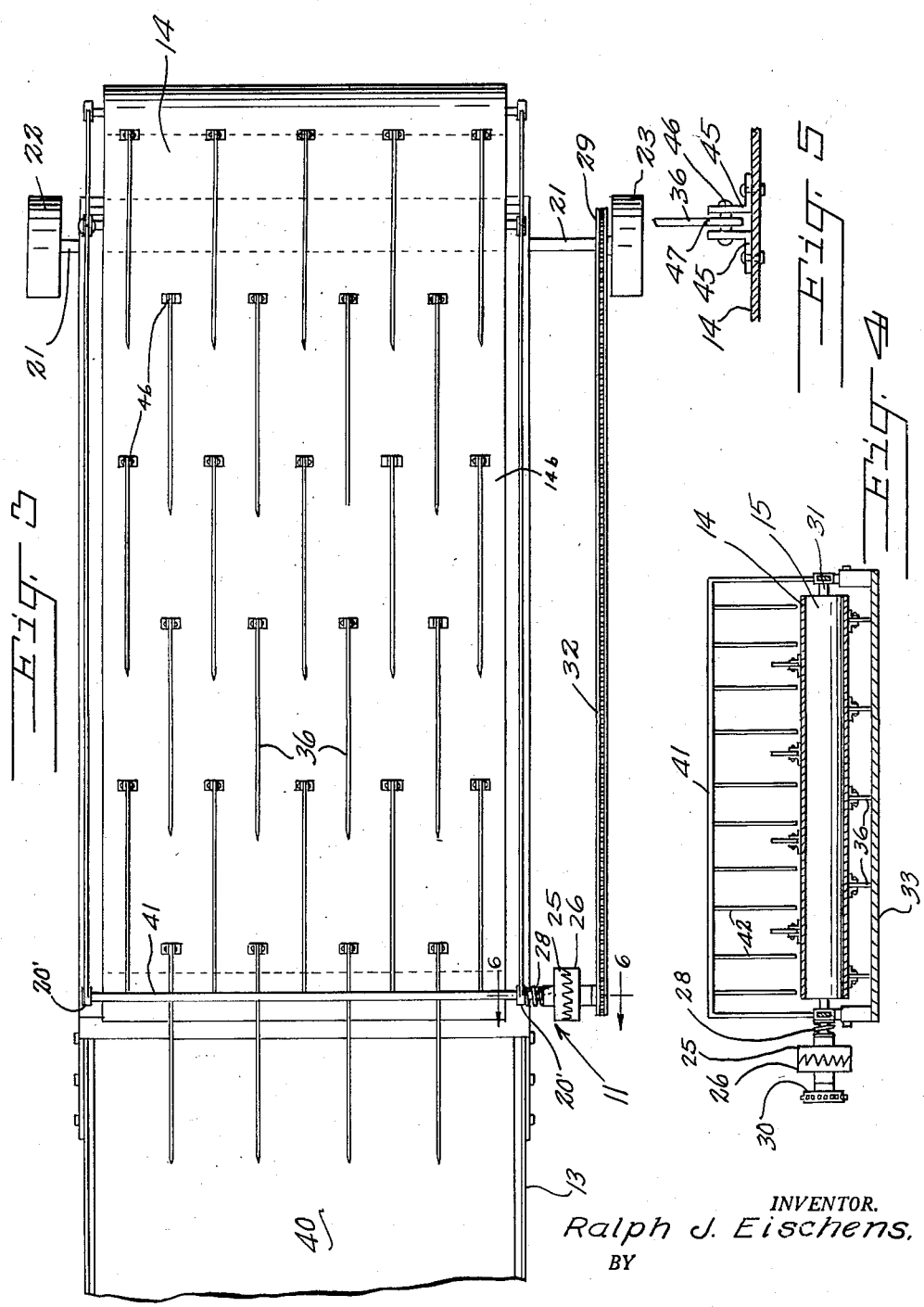
INVENTOR.
Ralph J. Eischens,
BY
McMorrow, Berman & Davidson
ATTORNEYS United States Patent Office 2,839,885
Patented June 24, 1958

2,839,885

PICKUP DEVICE WITH ENDLESS BELT PICKUP REEL

Ralph J. Eischens, Porter, Minn.

Application September 9, 1955, Serial No. 533,293

3 Claims. (Cl. 56—364)

This invention relates to agricultural implements, and more particularly to an improved pickup device for mechanically picking up severed material on the ground, such as severed grasses, hay, straw, or the like.

The main object of the invention is to provide a novel and improved pickup device for use with a farm combine or similar machine, to pickup severed material on the ground, such as grasses, hay, straw, or the like, and feed the gathered material to the machine, the improved pickup device being simple in construction, being easy to connect to the machine with which it is to be used, and providing a means of rapidly and efficiently gathering severed material on the ground with a minimum amount of human supervision.

A further object of the invention is to provide an improved pickup device for mechanically picking up severed material on the ground, such as severed grasses, hay, straw, or the like, said device being inexpensive to fabricate, being rugged in construction, being reliable in operation, and being arranged to rapidly pickup and convey the severed material to the intake means of the machine with which it is employed, such as the intake means of a grain binder, combine thresher, hay and straw baler, hay loader, and the like.

Further objects and advantages of the invention will become apparent from the following description and claims, and from the accompanying drawings, wherein:

Figure 1 is a side elevational view of an improved pickup device according to the present invention, shown attached to the forward end of a farm machine for conveying the material picked up to the intake portion of said farm machine.

Figure 2 is a front elevational view of the pickup device of Figure 1.

Figure 3 is a top plan view of the pickup device of Figures 1 and 2.

Figure 4 is a vertical cross sectional detail view taken on the line 4—4 of Figure 1.

Figure 5 is an enlarged cross sectional detail view taken on the line 5—5 of Figure 1.

Figure 6 is an enlarged cross sectional detail view taken on the line 6—6 of Figure 3.

Referring to the drawings, the pickup device is designated generally at 11 and comprises a main frame 12 adapted to be connected forwardly of a farm machine 13, as shown, so as to be rigidly secured to the farm machine for movement ahead of said farm machine. The main frame 12 is provided with suitable supporting means for a longitudinally mounted endless belt 14, for example, with respective rollers 15, 16 and 17 journaled transversely to the upper portion of the main frame 12, the roller 15 being located at the rear end of the main frame, the roller 16 being located at the upper forward end portion of the main frame and the roller 17 being located below and spaced rearwardly from the upper forward roller 16, all of the rollers being mounted for rotation on transverse horizontal axes. The thus described belt 14 has, as clearly shown in Figure 1, a horizontally disposed lower flight 14a, an upper flight 14b sloping upwardly from the end of the lower flight adjacent the rearward end of the frame 12 toward the forward end of the frame 12 and terminating at a point spaced vertically above and forwardly of the forward end of the frame, and an end flight 14c sloping downwardly and rearwardly from the terminating point of the upper flight toward and merging with the end of the lower flight adjacent the forward end of the frame 12.

Rigidly secured to the forward side portions of the main frame 12 are the depending vertical sleeves 18, 18' in which are adjustably secured the vertical bars 19, 19', said bars being formed at their lower ends with journal rings 20 through which extends the transverse axle 21. Secured to one end of the axle 21 is a first ground-engaging wheel 22. Secured to the opposite end of the axle 21 is a second ground-engaging wheel 23. Rear roller 15 is secured on a shaft 31 journaled in suitable bearing supports 20' rigidly secured to main frame 12.

Splined to the shaft 31 adjacent a bearing support 20' thereof is a first clutch segment 25. Designated at 26 is a second clutch segment having clutch teeth interengageable with the clutch teeth of the segment 25, said second clutch segment being secured on a sleeve 27 rotatably mounted on shaft 31. Also secured on sleeve 27 is a sprocket wheel 30. Sprocket wheel 30 is coupled to a sprocket wheel 29 on axle 21 by a sprocket chain 32.

A coiled spring 28 surrounds shaft 31 and bears between clutch segment 25 and bearing support 20', as shown in Figure 6, biasing segment 25 into engaging relationship with clutch segment 26. The interengaging teeth of the clutch segments are angled so that segment 26 will drive segment 25 only in a direction corresponding to forward motion of the top of belt 14, namely for clockwise rotation of roller 15, as viewed in Figure 1.

Therefore, the belt 14 moves in a direction to move the lower flight 14a from the forward end to the rearward end of the frame 12, the upper flight 14b from the rearward end to the forward end of the frame 12, and the end flight 14c from the terminating point of the upper flight 14b to the merging end of the lower flight 14a.

The frame 12 includes a substantially horizontal platform 33 which is spaced below the horizontal lower flight 14a of belt 14, as shown in Figure 1, the sides of the platform 33 being provided at the forward end of the platform with the arms 34 extending downwardly and forwardly, between the ends of which is journaled an abutment means or a transversely extending roller 35. The platform 33 has one end adjacent the end of the lower flight 14a of the belt 14 which is coincident with the forward end of the frame 12 and has the other end adjacent the end of the lower flight 14a of the belt 14 which is coincident with the rearward end of the frame 12.

Pivoted to the exterior surface of the belt 14 for free movement about an individual horizontal axis or rivet 46 are a plurality of tines 36, said tines being arranged in alternate rows, as shown in Figure 2, providing a staggered distribution of the tines, the tines being of substantial length and being arcuately curved, as illustrated. The curvature of the tines is such that the tines 36 on the portion of the belt 14, when constituting the upper flight, being adjacent to the belt and facing toward the rearward end of the frame 12, the tines 36 on the portion of the belt 14, when constituting the end flight, swinging about their axes 46 so as to depend from and face away from the belt 14, and the tines 36 on the portion of the belt 14, when constituting the lower flight, being adjacent to the belt and facing toward the forward end of the frame 12, with the tines on the portion of the belt 14, when constituting the end flight, being engageable, in turn, with the abutment means or roller 35 to first rigidify the tines to act as pickup elements followed by elevation so as to be received in the space between the platform 33 and the lower flight.

The rear end of the platform 33 terminates in a downwardly and rearwardly inclined discharge portion 39 overlying the intake end of the intake conveyor element 40 of the farm machine 13, whereby the severed material 37 is discharged onto the conveyor 40 as the tines move around the rear roller 15 with the belt 14.

Designated at 41 is a transverse upstanding comb member rigidly mounted on the rear portion of the frame 12 over the rear end of the belt 14, said comb member 41 having spaced depending vertical stationary tine elements 42 spaced between the pivoted tines 36 on the belt and being of sufficient length to clear the remnants of the gathered material 37 from between the tines 36 as the tines 36 move beneath the comb member 41 with the belt 14.

From the above description, the operation of the device will be readily apparent. As the device moves forwardly, the pivoted tines 36 on the portion of the belt 14 constituting the end flight 14c swing about their axes 46 so as to depend from and face away from the belt and are engaged, in turn, by the abutment means or roller 35 to first rigidify the tines to act as pickup elements for the severed material, such as severed grasses, hay, straw, or the like, shown at 37 in Figure 1, followed by elevation so as to be received with the severed material impaled thereon in the space between the platform 33 and the lower flight 14a. The material is moved rearwardly through said space and eventually discharges onto the conveyor 40, the tines being then rotated with the belt around the roller 15 and being cleared of remaining material 37 by the action of the vertical rigid depending comb teeth 42. The tines then travel along with the belt 14 until they pass around the roller 16, whereupon the tines drop to depending positions ready for engagement with the roller 35, whereby the above described cycle of operations is repeated.

The tines are of substantial length and are preferably made of resilient material, such as spring steel or the like, whereby said tines will flex freely when obstacles, such as large stones or the like, are encountered avoiding damage thereto, and whereby the tines will return to their normal configurations after passing such obstacles.

The purpose of the clutch members 25 and 26 is to prevent reverse movement of the belt 14 due to reverse rotation of the ground-engaging wheels 22 and 23 during the turning or backing of the farm machine 13 to which the pickup attachment may be connected. The clutch segments are thus arranged so that the belt will be driven by the ground-engaging wheels only during the forward movement of the device.

The belt 14 may be made of any suitable flexible material, such as heavy canvas, or the like, and the tines 36 may be pivoted to the exterior of the belt in any suitable manner, for example, in the manner illustrated in Figure 5, wherein respective angle brackets 45 are secured in opposing relationship to the belt 14, and the tine 36 is pivotally connected between the upstanding arms of the angle brackets 45 by a transverse rivet 46. Each tine 36 is provided with an eye element 47 at its end arranged to be received between the upstanding arms of a pair of angle brackets 45, and arranged to receive the transverse rivets 46 therethrough in the manner shown in Figure 5, thus providing the desired pivotal connection of the tine to the belt.

While a specific embodiment of an improved pickup device for mechanically picking up severed material from the ground, such as grasses, hay, straw, or the like, has been described in the foregoing description, it will be understood that various modifications within the spirit of the invention may occur to those skilled in the art. Therefore, it is intended that no limitations be placed on the invention except as defined by the scope of the appended claims.

What is claimed is:

1. A straw pickup attachment comprising a frame having a forward end and a rearward end, and a pair of ground engaging wheels supporting the forward end of said frame above a ground surface, means on the rearward end of said frame for connection to the forward end of a farm vehicle, an endless belt arranged longitudinally of and supported on said frame, said belt having a horizontally disposed lower flight, an upper flight sloping upwardly from the end of said lower flight adjacent the rearward end of said frame toward the forward end of said frame and terminating at a point spaced vertically above and forwardly of the forward end of said frame, and an end flight sloping downwardly and rearwardly from the terminating point of the upper flight toward and merging with the end of the lower flight adjacent the forward end of said frame, a horizontally disposed platform carried by said frame and positioned below and spaced from the lower flight of said belt and having one end adjacent the end of the lower flight coincident with the forward end of said frame and having the other end adjacent the end of the lower flight coincident with the rearward end of said frame, a plurality of tines arranged in spaced staggered relation along the exterior surface of said belt and each having one end connected to said belt for free pivotal movement about a horizontal axis, abutment means positioned transversely of said platform adjacent to and below said one end of said platform and carried by said platform, and means driving said belt in a direction to move the lower flight from the forward end to the rearward end of said frame, the upper flight from the rearward end to the forward end of said frame, and the end flight from the terminating point of the upper flight to the merging end of the lower flight, the tines on the portion of said belt when constituting the upper flight being adjacent to the belt and facing toward the rearward end of said frame, the tines on the portion of said belt when constituting the end flight swinging about their axes so as to depend from and face away from said belt, and the tines on the portion of said belt when constituting the lower flight being adjacent to the belt and facing toward the forward end of the frame, with the tines on the portion of said belt when constituting the end flight being engageable in turn with said abutment means to first rigidify the tines to act as a pickup element followed by elevation so as to be received in the space between the platform and the lower flight.

2. The attachment according to claim 1 in which said abutment means comprises a rotatable roller.

3. The attachment according to claim 1 which includes in addition a depending lip on the end of said platform adjacent the rearward end of said frame for directing the discharge of gathered material from the space between the belt lower flight and platform.

References Cited in the file of this patent

UNITED STATES PATENTS

| | | |
|---|---|---|
| 833,309 | Davison | Oct. 16, 1906 |
| 2,643,754 | Doak | June 30, 1953 |